United States Patent
Zhang et al.

(10) Patent No.: US 11,958,919 B2
(45) Date of Patent: Apr. 16, 2024

(54) "LIVING" RADICAL POLYMERIZATION METHOD FOR VINYL MONOMER BY NEAR-INFRARED PHOTOTHERMAL CONVERSION

(71) Applicant: SOOCHOW UNIVERSITY, Suzhou (CN)

(72) Inventors: Lifen Zhang, Suzhou (CN); Qun Gao, Suzhou (CN); Zhenping Cheng, Suzhou (CN); Kai Tu, Suzhou (CN); Haihui Li, Suzhou (CN); Lan Yao, Suzhou (CN); Xiulin Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 626 days.

(21) Appl. No.: 17/265,937

(22) PCT Filed: Jan. 8, 2020

(86) PCT No.: PCT/CN2020/070786
§ 371 (c)(1),
(2) Date: Feb. 4, 2021

(87) PCT Pub. No.: WO2021/128473
PCT Pub. Date: Jul. 1, 2021

(65) Prior Publication Data
US 2022/0112316 A1 Apr. 14, 2022

(30) Foreign Application Priority Data
Dec. 27, 2019 (CN) .......................... 201911382047.8

(51) Int. Cl.
*C08F 2/38* (2006.01)
*B01J 19/00* (2006.01)
(Continued)

(52) U.S. Cl.
CPC ............ *C08F 2/38* (2013.01); *B01J 19/0013* (2013.01); *B01J 19/0053* (2013.01);
(Continued)

(58) Field of Classification Search
CPC .. C08F 2/38; C08F 2/46; C08F 112/08; C08F 120/14; C08F 120/56; C08F 120/54; B01J 19/0013; B01J 19/0053; B01J 19/128
See application file for complete search history.

(56) References Cited

U.S. PATENT DOCUMENTS

2004/0204556 A1 10/2004 Matyjaszewski et al.
2006/0004160 A1 1/2006 Favier et al.

FOREIGN PATENT DOCUMENTS

CN 103288996 A 9/2013
CN 104130342 A 11/2014
(Continued)

*Primary Examiner* — Catherine S Branch
(74) *Attorney, Agent, or Firm* — SZDC Law PC (57) ABSTRACT

The present invention provides a "living" radical polymerization method for a vinyl monomer by near-infrared photothermal conversion. The method comprises irradiating a reactor with near-infrared light of 750-850 nm, wherein the reactor has a first chamber and a second chamber that are isolated from each other, the first chamber contains an organic solution of a near-infrared light responsive croconaine dye, and the second chamber is provided with a closed reaction flask containing a reaction solution, the reaction solution comprises a vinyl monomer, two or more of an ATRP initiator, an ATRP ligand, an ATRP catalyst, an RAFT reagent, a thermal initiator, and an additive, and an organic solvent; and the near-infrared light responsive dye converts the near-infrared light into heat energy, by which the reactor is heated to 50-100° C. to polymerize the monomer in the reaction solution, to obtain polymers with controlled molecular weights and molecular weight distributions.

9 Claims, 7 Drawing Sheets

(51) Int. Cl.
    *B01J 19/12*     (2006.01)
    *C08F 2/46*     (2006.01)
    *C08F 112/08*     (2006.01)
    *C08F 120/14*     (2006.01)
    *C08F 120/32*     (2006.01)
    *C08F 120/54*     (2006.01)
    *C08F 120/56*     (2006.01)

(52) U.S. Cl.
    CPC ............... *B01J 19/128* (2013.01); *C08F 2/46* (2013.01); *C08F 112/08* (2013.01); *C08F 120/14* (2013.01); *C08F 120/32* (2013.01); *C08F 120/56* (2013.01); *B01J 2219/00146* (2013.01); *B01J 2219/00277* (2013.01); *C08F 2438/01* (2013.01); *C08F 2438/03* (2013.01)

(56) References Cited

FOREIGN PATENT DOCUMENTS

| | | | |
|---|---|---|---|
| CN | 104755506 A | 7/2015 | |
| CN | 206676374 U | 11/2017 | |
| EP | 3501837 A1 * | 6/2019 | ............ B41M 5/465 |

* cited by examiner

"LIVING" RADICAL POLYMERIZATION METHOD FOR VINYL MONOMER BY NEAR-INFRARED PHOTOTHERMAL CONVERSION

This application is the National Stage Application of PCT/CN2020/070786, filed on Jan. 8, 2020, which claims priority to Chinese Patent Application No. 201911382047.8, filed on Dec. 27, 2019, which is incorporated by reference for all purposes as if fully set forth herein.

FIELD OF THE INVENTION

The present invention relates to the technical field of polymer preparation, and more particularly to a "living" radical polymerization method for a vinyl monomer by near-infrared photothermal conversion.

DESCRIPTION OF THE RELATED ART

In "living"/controlled radical polymerization (LRP), the polymerization can be regulated by controlling the reaction conditions such as temperature, light irradiation, mechanical force, applied voltage, and chemical redox. According to the wavelength of light, the light source for photopolymerization can be roughly divided into ultraviolet light (UV, <400 nm, about 6 eV), visible light (vis, 400-700 nm, about 2 eV) and near-infrared light (NIR, 670-1100 nm, about 1.5 eV) and so on. In recent years, a variety of light-controlled LRP technologies are developed by researchers using ultraviolet light, visible light and other light sources, such as initiation-transfer-termination polymerization (Iniferter), nitroxide mediated radical polymerization (NMP), atom transfer radical polymerization (ATRP), reversible complexation mediated polymerization (RCMP) in the presence of iodine, bromine-iodine transformation living radical polymerization, and photo-induced electron transfer-reversible addition-fragmentation chain transfer polymerization (PET-RAFT), etc. However, it can be found through research that most light-controlled LRPs are performed in the blue band or under UV with a shorter wavelength. Such a light source of short wavelength has high energy, but is likely to cause a side reaction. Moreover, the light of short wavelength will be refracted and scattered during the penetration process, which causes the defects such as insufficient penetration ability. Near-infrared (NIR) light sources are characterized by long wavelength and low energy. Calculations according to relevant theory show that the depth of penetration of near-infrared light into tissues can reach 7-14 cm, while the fluorescent background for living bodies can be almost completely eliminated. However, polymerization controlled by near-infrared light suffers from various disadvantages. For example, compared with UV and visible light, NIR energy is lower, which is difficult to effectively induce the chemical reactions under normal conditions. Few literatures on LRP controlled by near-infrared light are available so far. For example, bacteriochlorophyll a is used by Boyer et al. as a catalyst for PET-RAFT polymerization to obtain a polymer with controlled molecular weight and narrow molecular weight distribution. However, this catalyst is difficult to synthesize and expensive, which is not conducive to large-scale production.

SUMMARY OF THE INVENTION

To solve the above technical problems, an object of the present invention is to provide a "living" radical polymerization method for a vinyl monomer by near-infrared photothermal conversion. In the method, photothermal conversion by means of a near-infrared light responsive substance is utilized, that is, the heat energy generated under light irradiation is used as the energy required in the polymerization reaction to realize "living"/controlled radical polymerization. In the method of the present invention, the conditions are mild, a wide range of monomers can be used, and the near-infrared dye solution has stable photothermal performance and can be recycled for a long period of time.

To solve the above technical problems, the following technical solutions are utilized in the present invention.

An object of the present invention is to provide a "living" radical polymerization method for a vinyl monomer by near-infrared photothermal conversion. The method comprises irradiating a reactor with near-infrared light having a wavelength of 750-850 nm. The reactor is provided with a first chamber and a second chamber that are isolated from each other, where the first chamber contains an organic solution of a near-infrared light responsive dye, and the second chamber is provided with a closed reaction flask containing a reaction solution and filled with a protective gas. The near-infrared light is irradiated into the near-infrared light responsive dye solution in the first chamber, and the near-infrared light is converted into heat energy, by which the reaction flask in the second chamber is heated to 50-100° C. that is the temperature required for polymerization. Depending on the components in the reaction solution, a variety of "living" radical polymerization techniques for vinyl monomers are constructed to obtain polymers represented by Formulas (4)-(6).

The near-infrared light responsive dye is selected from the croconaine compounds of Formula (1), Formula (2), Formula (3) and any combination thereof.

(1)

(2)

(3)

in which $n_1$ and $n_2$ are each independently selected from 1-10;

the reaction solution includes a vinyl monomer, an organic solvent, an ATRP initiator, an ATRP ligand, and an ATRP catalyst; or the reaction solution includes a vinyl monomer, an organic solvent, an RAFT reagent, and a thermal initiator; or the reaction solution includes a vinyl monomer, an organic solvent, an ATRP initiator, and an additive, where the additive is an organic amine and/or an iodine-containing compound.

The polymers of Formulas (4), (5) and (6) respectively have the following structures:

in which $m_1$, $m_2$ and $m_3$ are each independently selected from 10-300;

$R_1$, $R_1'$ and $R_1''$ are each independently selected from isobutylcyano, 4-cyanovaleric acid-yl, ethyl 2-phenylacetate substituent group, or ethyl 2-isobutyrate substituent group; $R_2$, $R_2'$ and $R_2''$ are each independently selected from hydrogen or methyl;

$R_3$, $R_3'$ and $R_3''$ are each independently selected from phenyl, 2-naphthyl, bromo, chloro, or iodo;

$R_4$ is selected from methyl, butyl, polyethylene glycol monomethyl ether, hydroxyethyl, hydroxypropyl or N,N-dimethylaminoethyl;

$R_5$ is selected from hydrogen, methyl, ethyl or hydroxymethyl; and $R_6$ is selected from hydrogen, methyl, ethyl or hydroxymethyl.

Preferably, "living" radical polymerization includes atom transfer radical polymerization (ATRP), bromine-iodine transformation "living" radical polymerization, and reversible addition-fragmentation chain transfer polymerization (RAFT). When the reaction solution includes a vinyl monomer, an organic solvent, an ATRP initiator, an ATRP ligand, and an ATRP catalyst, the vinyl monomer undergoes ATRP polymerization. When the reaction solution includes a vinyl monomer, an organic solvent, an RAFT reagent and a thermal initiator, the vinyl monomer undergoes RAFT polymerization. When the reaction solution includes a vinyl monomer, an organic solvent, an ATRP initiator and an additive, the vinyl monomer undergoes bromine-iodine transformation "living" radical polymerization.

Preferably, in the organic solution of the near-infrared light responsive dye, the concentration of the near-infrared light responsive dye is 1.0-10.0 mg/mL; and the power of the near-infrared light is 0.05-1.0 W/cm$^2$, and more preferably 0.1-0.3 W/cm$^2$.

Preferably, the vinyl monomer is methyl acrylate, methyl methacrylate (MMA), butyl acrylate, butyl methacrylate, polyethylene glycol monomethyl ether acrylate, polyethylene glycol monomethyl ether methacrylate, hydroxyethyl acrylate, hydroxyethyl methacrylate, hydroxypropyl acrylate, hydroxypropyl methacrylate, N,N-dimethylaminoethyl methacrylate, glycidyl methacrylate, styrene, N,N-dimethylacrylamide, N,N-diethylacrylamide, or N-dihydroxyethylacrylamide.

Preferably, the ATRP initiator is selected from the group consisting of ethyl 2-bromophenylacetate, ethyl 2-bromoisobutyrate and 2-iodo-2-methylpropionitrile and any combination thereof; the ATRP ligand is selected from the group consisting of bipyridine, pentamethyldivinyltriamine, hexamethyltrivinyltetraamine, triphenylphosphine and any combination thereof; and the ATRP catalyst is selected from the group consisting of CuBr, CuCl, FeBr$_2$, FeCl$_2$ and any combination thereof.

Preferably, the RAFT reagent is cyanoisopropyl dithionaphthalate or 4-cyano-4-(thiobenzoyl)pentanoic acid; and the thermal initiator is azodiisobutyronitrile and/or benzoyl peroxide.

Preferably, when $R_1$ is isobutylcyano, the RAFT reagent is cyanoisopropyl dithionaphthalate (CPDN); and when $R_1$ is 4-carboxy-2-cyanobutan-2-yl, the RAFT reagent is 4-cyano-4-(thiobenzoyl)valeric acid (CPADB). CPADB is more preferably.

Preferably, the additive is selected from the group consisting of NaI, KI, triethylamine, triethanolamine, tetrabutylammonium iodide and any combination thereof.

Preferably, the organic solvent is selected from the group consisting of toluene, acetone, ethanol, methanol, N,N-dimethylformamide, dimethylsulfoxide and any combination thereof.

Preferably, the molar ratio of the vinyl monomer, the RAFT reagent and the thermal initiator is 50-1000:2:1-0.5; the molar ratio of the vinyl monomer, the ATRP initiator, the ATRP catalyst and the ATRP ligand is 50-1000:1:0.01-1.5: 0.3-4.5; and the molar ratio of the vinyl monomer, the ATRP initiator and the additive is 50-1000:1:1-10. More preferably, the molar ratio of the vinyl monomer, the RAFT reagent and the thermal initiator is 300-500:2:1; the molar ratio of the vinyl monomer, the ATRP initiator, the ATRP catalyst and the ATRP ligand is 100-500:1:0.05-1:0.3-3; and the molar ratio of the vinyl monomer, the ATRP initiator and the additive is 50-500:1:1-2.

Preferably, in the reaction solution, the concentration of the vinyl monomer is 1.0-8.0 mol/L, and More preferably 1.0-4.0 mol/L.

Preferably, the reaction time is 1-20 h.

Preferably, the second chamber is surrounded by the first chamber, and the first chamber is surrounded by a near-infrared light generator.

Preferably, the reactor is a glass jacketed reaction flask, and the second chamber provides a water bath environment for the closed reaction flask.

Preferably, the solvent in the organic solution of the near-infrared light responsive dye is toluene.

Preferably, the light source for illumination in the present invention is a near-infrared LED lamp. More preferably, the light wavelength is 810 nm.

The present invention further discloses a device for polymerization by near-infrared photothermal conversion, which comprises a reactor for receiving near-infrared light irradiation, wherein the reactor is provided with a first chamber and a second chamber that are isolated from each other, the first chamber contains an organic solution of a near-infrared light responsive dye, and the second chamber is provided with a reaction flask containing a reaction solution. The near-infrared light is irradiated into the first chamber, so that the near-infrared light responsive dye in the first chamber converts the near-infrared light into heat energy, by which the reaction solution in the second chamber is heated to 50-100° C.

Preferably, the second chamber is surrounded by the first chamber, and the first chamber is surrounded by an illumination unit which emits near-infrared light.

By means of the above technical solution, the present invention has the following advantages.

In the device for polymerization by near-infrared photothermal conversion according to the present invention, the near-infrared light responsive dye is used to convert the near-infrared light into heat energy, by which the reactor is heated. By generating the heat energy required in polymerization by means of near-infrared photothermal conversion, the problems of uneven light irradiation and poor penetration of short-wavelength light are avoided. In the method of the present invention, the conditions are mild, a wide range of monomers can be used, and the used near-infrared dye solution has stable photothermal performance and can be recycled for a long period of time. With the preparation method of the present invention, the molecular weight of the polymer increases linearly with the increase of the conversion rate, and the molecular weight distribution is also narrow ($M_w/M_n$<1.20), which conforms with the characteristics of "living" radical polymerization.

The above description is only a summary of the technical solutions of the present invention. To make the technical means of the present invention clearer and implementable in accordance with the disclosure of the specification, the preferred embodiments of the present invention will be described in detail with reference to the accompanying drawings.

DETAILED DESCRIPTION OF THE PREFERRED EMBODIMENTS

The detailed description of the present invention will be described in further detail with reference to the accompanying drawings and specific embodiments. The following embodiments are intended to illustrate the present invention, instead of limiting the scope of the present invention.

In the following examples of the present invention, the raw material MMA used needs to be passed through a neutral alumina column to remove the polymerization inhibitor, and then placed in the upper part of the refrigerator for storage. The near-infrared responsive croconaine dye is synthesized in the laboratory according to the methods in the literature "*Dyes Pigments*, 2008, 78, 60." and "*J. Am. Chem. Soc.*, 2017, 139, 11333". Other reagents are commercially available and can be used directly.

In the present invention, the following test methods are used:

1. The number average molecular weight ($M_{n,GPC}$) and molecular weight distribution ($M_w/M_n$) of the obtained polymer are measured by TOSOH HLC-8320 Gel Permeation Chromatography (GPC). The instrument is equipped with a TOSOH differential refractive index detector, a guard column (4.6×20 mm, TSKgel guard column SuperMP-N), and two test columns (4.6×150 mm, TSKgelSupermultiporeHZ-N). The testable molecular weight ranges from $5×10^2$ to $5×10^5$ g/mol. During the test, THF is used as the mobile phase, the temperature is 40° C., and the flow rate is 0.35 mL/min. The sample is drawn by the TOSOH autosampler for test. When the data is analyzed, the linear PMMA purchased from TOSOH is used as the standard. The sample for GPC test is prepared as follows: 20 μL of a mixed solution of the polymer is lyophilized to remove the solvent, and then dissolved in THF; the polymer solution is passed through a small column of neutral alumina and a syringe fitted with 0.45 μm filter; finally, the neat polymer solution is injected into a test vial.

2. The NMR spectra of the obtained products and polymers are measured by Bruker 300 MHz Nuclear Magnetic Resonance Spectrometer, where $CDCl_3$ is used as a deuterated reagent, the test is performed at room temperature (25° C.), and tetramethylsilane (TMS) is used as an internal standard.

3. UV-vis is measured by Shimadzu UV-2600 ultraviolet-visible spectrophotometer, where toluene is used as a solvent.

Example 1. Study on the Photothermal Conversion Efficiency of Near-Infrared Responsive Croconaine Dye A croconaine dye of Formula (1) was dissolved in 7 mL of toluene, to give various concentrations (2.0 mg/mL, 5.0 mg/mL, and 6.0 mg/mL). The solutions were respectively added to an outer jacket layer, that is, a first chamber, of a glass jacketed reaction flask. The glass jacket reaction flask was then placed under a near-infrared ring light source ($\lambda_{max}$=810 nm), and the temperature rise per minute of various concentrations of dye was tested by Hti HT-18 infrared imager.

Figure 1:
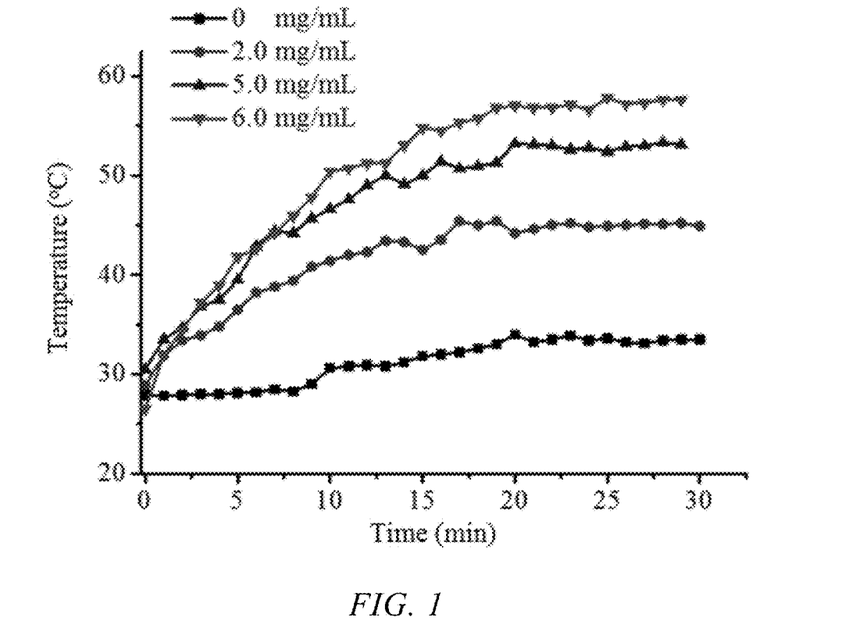
FIG. 1 shows the test results of heating with different concentrations of a near-infrared responsive croconaine dye under irradiation with near-infrared light ($\lambda_{max}$=810 nm, 100 mW/cm$^2$)

FIG. 1 shows the test results of heating with different concentrations (0 mg/mL, 2.0 mg/mL, 5.0 mg/mL, 6.0 mg/mL) of a near-infrared responsive croconaine dye under irradiation with near-infrared light ($\lambda_{max}$=810 nm, 100 mW/cm$^2$).

Following the above method, the temperature rise of the croconaine dye with a concentration of 6.4 mg/mL was determined under irradiation of near-infrared light ($\lambda_{max}$=810 nm) at various powers (0.10 W/cm$^2$, 0.15 W/cm$^2$, 0.22 W/cm$^2$, and 0.34 W/cm$^2$).

Figure 2:
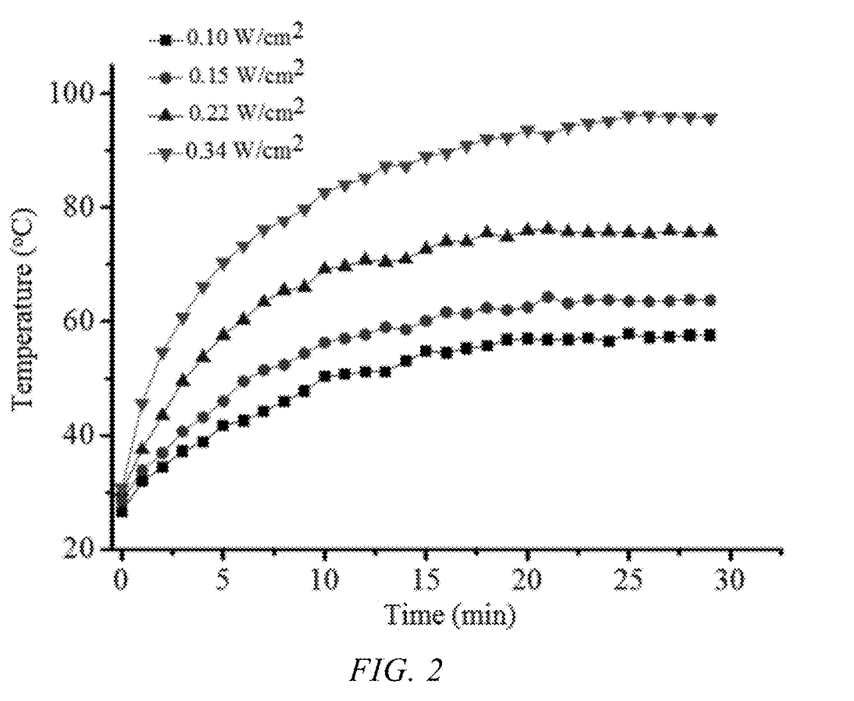
FIG. 2 shows the test results of heating with a near-infrared responsive dye at 6.4 mg/mL under irradiation with near-infrared light ($\lambda_{max}$=810 nm) at various powers.
Figure 3:
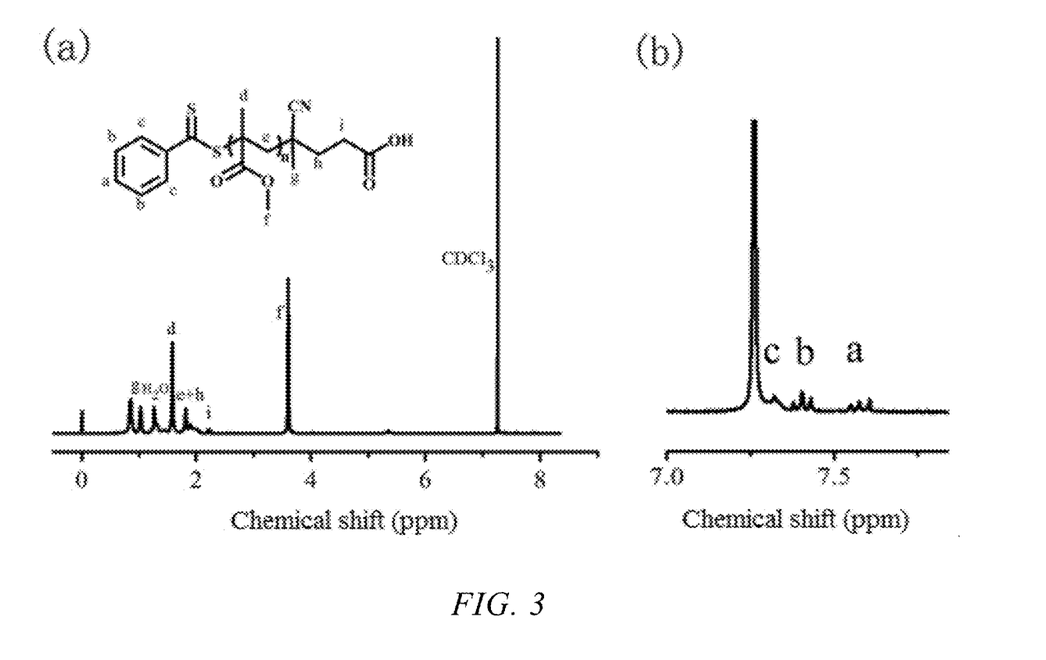
FIG. 3 shows a $^1$H NMR spectrum of the polymer PMMA in Example 2.

FIG. 2 shows the test results of heating with a croconaine dye at 6.4 mg/mL under irradiation with near-infrared light at various powers.

Figure 4:
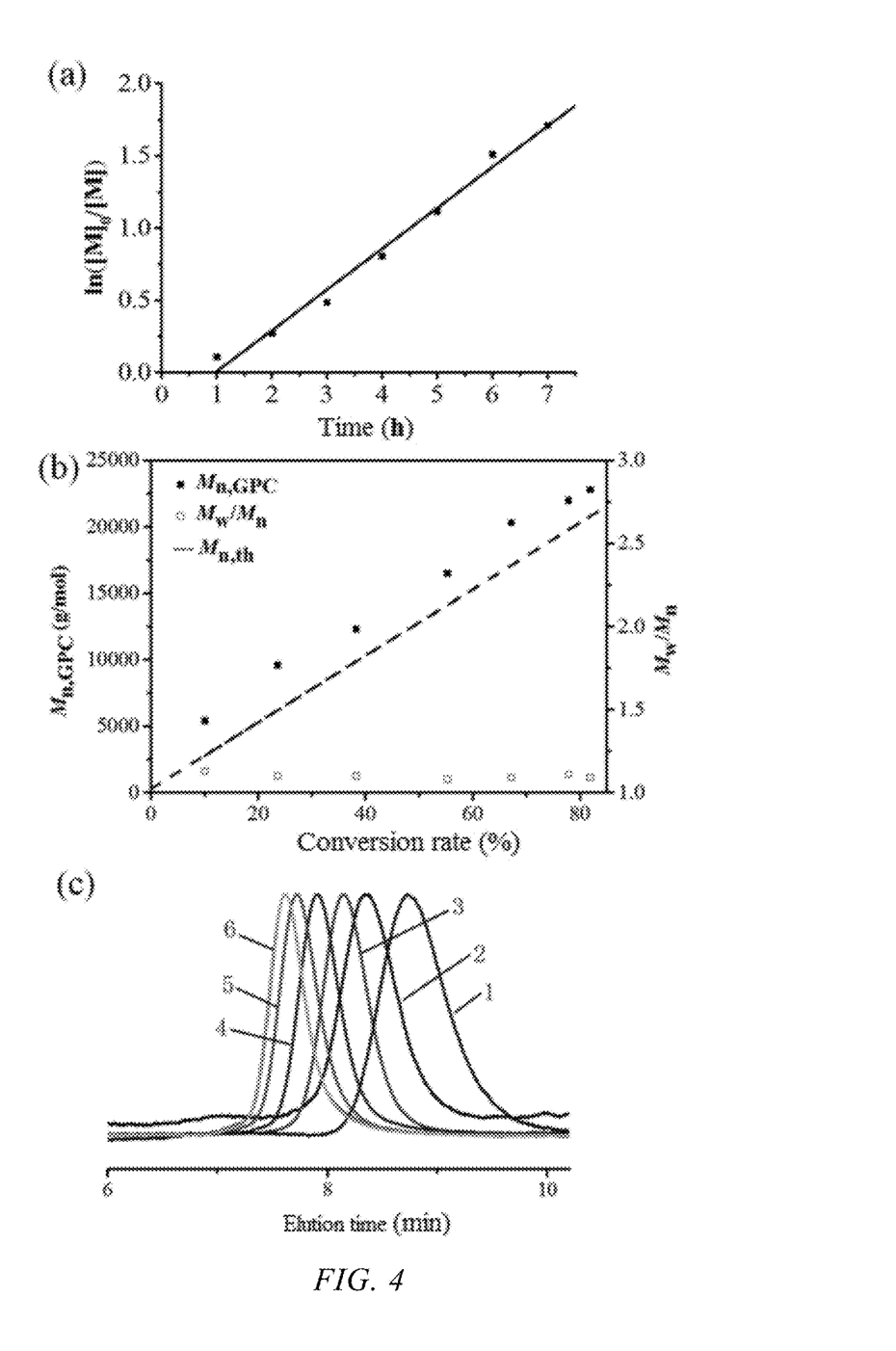
FIG. 4 shows the polymerization kinetics and the curve of elution from GPC during the preparation process of the polymer PMMA in Example 2.

Example 2. Preparation of Polymethyl Methacrylate by Reversible Addition-Fragmentation Chain Transfer (RAFT) Polymerization 35.0 mg of a croconaine dye (1) was dissolved in 7.0 mL of toluene, and then added to an outer jacket layer (a first chamber) of a glass jacketed reaction flask and used as a heat source for photothermal conversion. A water bath environment was provided in the inner layer of the glass jacketed reaction flask, where an ampoule (a second chamber) containing a reaction solution was positioned. The reaction solution was prepared as follows. The monomer methyl methacrylate (MMA) (0.20 mL, 1.88 mmol), the RAFT reagent 4-cyano-4-(thiobenzoyl)pentanoic acid (CPADB) (2.10 mg, 7.53×10$^{-3}$ mmol), and the thermal initiator azodiisobutyronitrile (AIBN) (0.62 mg, 3.76×10$^{-3}$ mmol) at a molar ratio of [MMA]$_0$/[CPADB]$_0$/[AIBN]$_0$=500:2:1 and toluene (0.30 mL) were added to a 2 mL clean ampoule, in which a clean stir bar was added. The mixed solution was a pink homogeneous solution. The ampoule was positioned in liquid nitrogen to freeze the solution, after evacuating for 20-30 seconds, the ampoule was filled with argon and then thawed at room temperature. This process was repeated three times. Then, the ampoule was sealed. The sealed ampoule was placed in the inner water bath of the glass jacketed reaction flask, and then the glass jacketed reaction flask was positioned at the center of a near-infrared ring light source ($\lambda_{max}$=810 nm, 100 mW/cm$^2$), where the glass jacketed reaction flask was placed on a magnetic stirrer, and the constant temperature for photothermal conversion is 59.8° C. After reaction for a certain time, the ampoule was cooled down and opened. 20 μL of a polymer (PMMA) solution was pipetted and dissolved in $CDCl_3$ for test by $^1$H NMR, and the conversion rate was calculated. The structural formula of the product PMMA prepared by the above method is shown below:

Under the above reaction conditions, the monomer conversion at different reaction times was measured. FIG. 4 shows the polymerization kinetics. It can be seen from FIG. 4(a) that ln([M]$_0$/[M]) conforms to the first-order kinetics over 0 to 7 h. It can be seen from FIG. 4(b) that the molecular weight of the polymer substantially tend to grow linearly with the increase of the conversion rate; and the molecular weight distribution is also narrow ($M_w/M_n$<1.20). The molecular weight obtained by GPC is closer to the theoretical molecular weight, which indicates that the polymer has a higher degree of terminal functionalization. The polymerization kinetics show that using CPADB as a chain transfer reagent, the RAFT polymerization of MMA initiated under the irradiation of a near-infrared ring light source conforms to the characteristics of "living" polymerization. In FIG. 4(c), the curves from right to left correspond to the polymerization products of number 1, 2, 3, 4, 5, 6, and 7 in Table 1. It can be seen from FIG. 4(c) that the change from a long elution time to a short time of the polymer indicates an increase process of the molecular weight of the polymer.

Table 1 shows the test results of polymerization at various polymerization times, in which the conversion rate of the monomer (Conv. %) is measured by $^1$H NMR, R represents [MMA]$_0$/[CPADB]$_0$/[AIBN]$_0$, $M_{n,th}$ represents the molecular weight calculated according to the formula $M_{n,th}=M_{CPADB}+[Monomer]_0[CPADB]_0×M_{monomer}×Conv.$ (%), $M_{n,GPC}$ represents the molecular weight obtained by GPC, and $M_w/M_n$ represents the molecular weight distribution.

TABLE 1

Test results of polymerization at various polymerization times

| Entry | R | Time (h) | [b]Conv. (%) | [c]$M_{n,th}$ (g/mol) | [d]$M_{n,GPC}$ (g/mol) | [d]$M_w/M_n$ |
|---|---|---|---|---|---|---|
| 1 | 500/2/1 | 1 | 10.1 | 2800 | 5400 | 1.13 |
| 2 | 500/2/1 | 2 | 23.6 | 6200 | 9600 | 1.10 |
| 3 | 500/2/1 | 3 | 38.3 | 9900 | 12300 | 1.10 |
| 4 | 500/2/1 | 4 | 55.3 | 14100 | 16500 | 1.08 |
| 5 | 500/2/1 | 5 | 67.2 | 17100 | 20300 | 1.09 |
| 6 | 500/2/1 | 6 | 77.9 | 19800 | 22000 | 1.11 |
| 7 | 500/2/1 | 7 | 81.9 | 20800 | 22800 | 1.09 |

Figure 5:
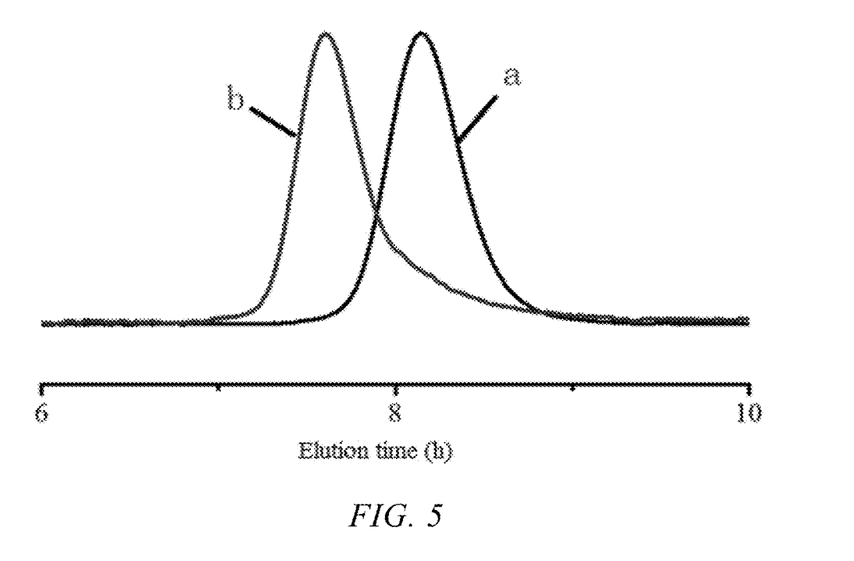
FIG. 5 shows the result after chain propagation of the polymer PMMA in Example 2.
Figure 6:
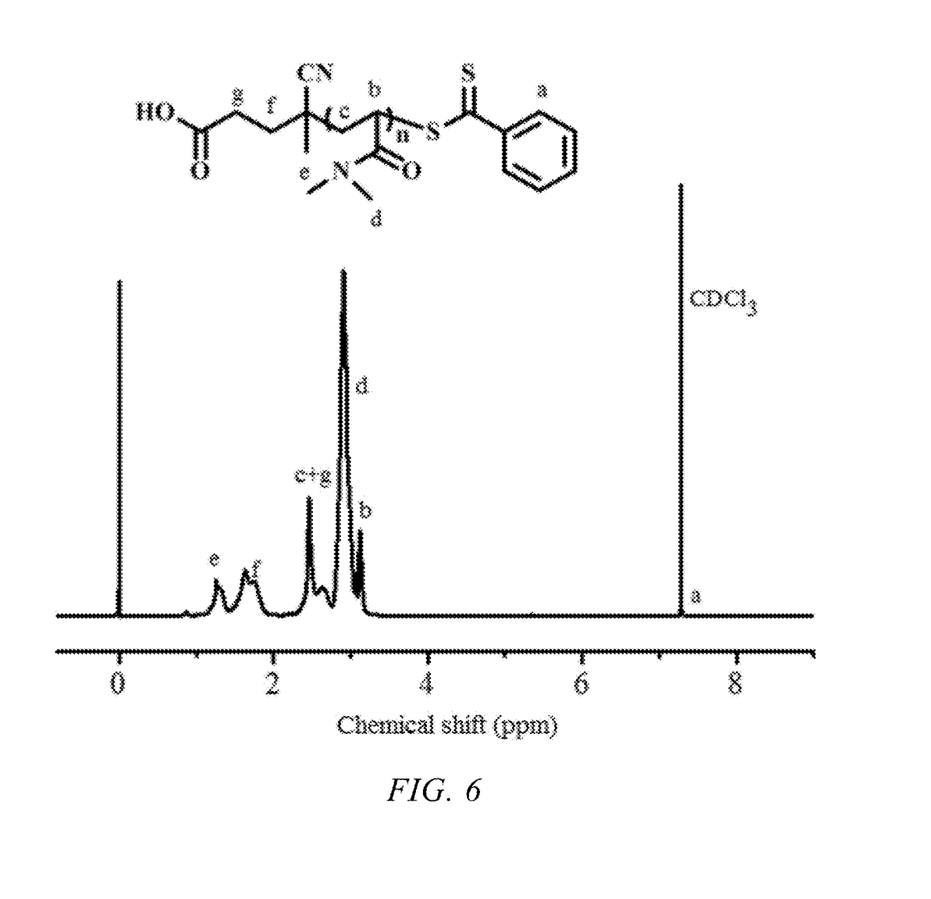
FIG. 6 shows a $^1$H NMR spectrum of the polymer PDMA in Example 3.
Figure 7:
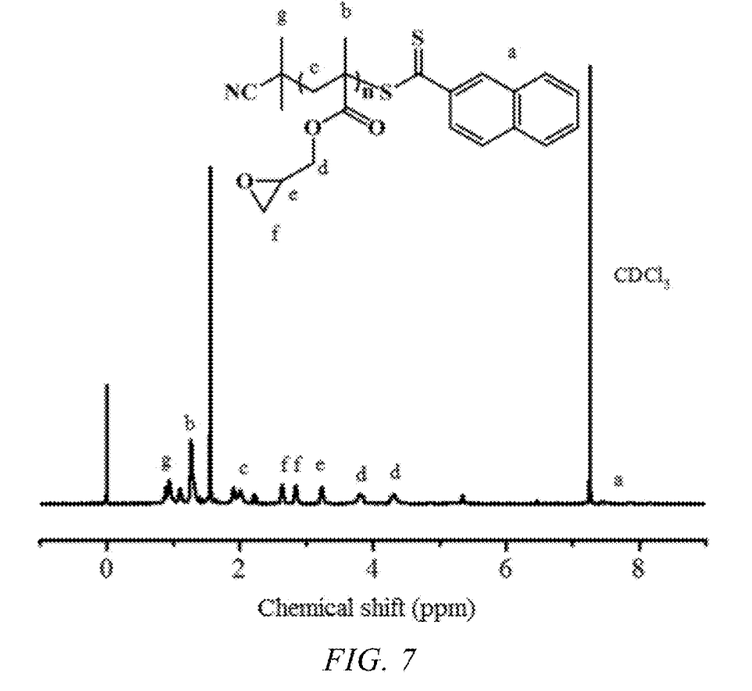
FIG. 7 shows a $^1$H NMR spectrum of the polymer PGMA in Example 4.
Figure 8:
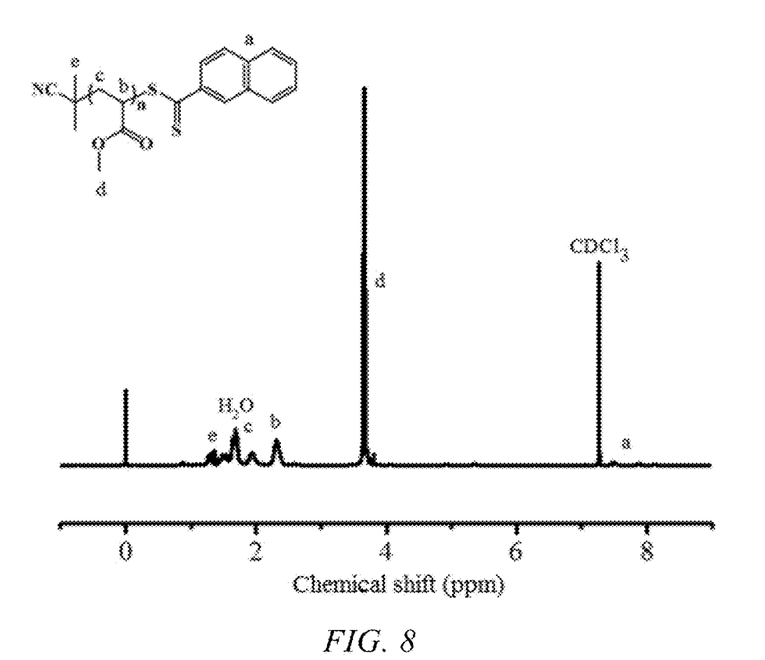
FIG. 8 shows a $^1$H NMR spectrum of the polymer PMA in Example 5.
Figure 9:
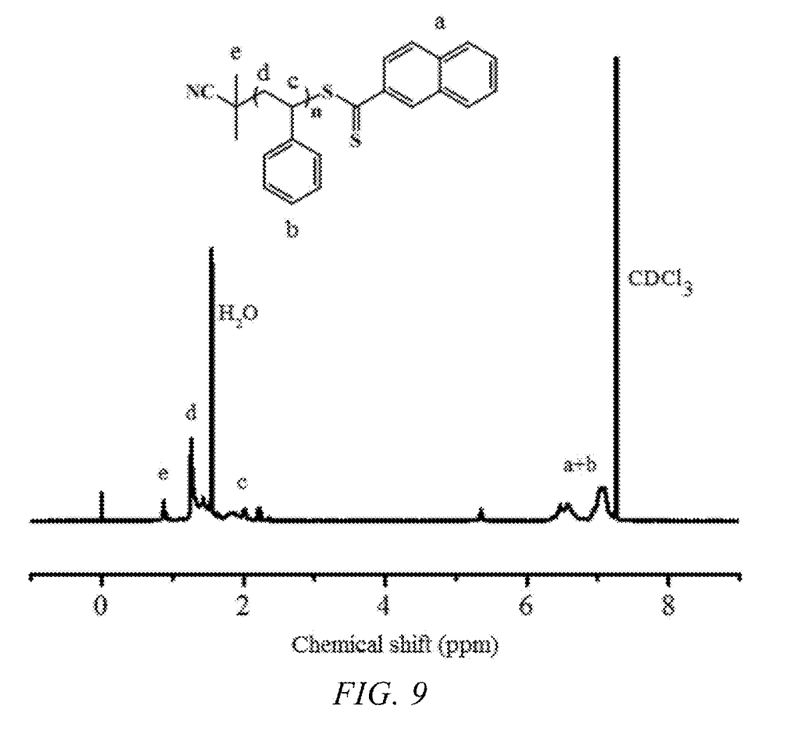
FIG. 9 shows a $^1$H NMR spectrum of the polymer PS in Example 6.

PMMA with a molecular weight of 12300 g/mol and a molecular weight distribution of 1.10 (curve a in FIG. 5) obtained after polymerization for 1 h was used as a macromolecular RAFT reagent for chain extension. The PMMA was mixed with the monomer and the initiator at a ratio of $[MMA]_0:[PMMA]_0:[AIBN]_0=600:1:0.5$, followed by treatments as described above. After 3.5 h of irradiation under near-infrared light ($\lambda_{max}$=810 nm, 100 mW/cm$^2$), a polymer with a molecular weight of 21600 g/mol and a molecular weight distribution of 1.10 (curve b in FIG. 5) was obtained after the same treatments, which indicates that the synthesized polymer has "living" characteristics.

In the present invention, besides MMA, the monomer used for polymerization can also be other monomers such as methyl acrylate, butyl (meth)acrylate, polyethylene glycol monomethyl ether (meth)acrylate, hydroxyethyl (meth)acrylate, and N,N-dimethylaminoethyl (meth)acrylate, "living"/controlled polymers can also be obtained by the above-mentioned polymerization method.

Example 3. Preparation of Poly N,N-Dimethylacrylamide (PDMA) by RAFT Polymerization 35.0 mg of a near-infrared responsive croconaine dye represented by Formula (1) was dissolved in 7 mL of toluene, and transferred to an outer jacket layer, that is, a first chamber, of a glass jacketed reaction flask and used as a heat source for photothermal conversion. A water bath environment was provided in the inner layer of the glass jacketed reaction flask, where an ampoule (i.e., second chamber) containing a reaction solution was positioned. The reaction solution was prepared as follows. The monomer N,N-dimethylacrylamide (DMA) (0.20 mL, 1.80 mmol), the RAFT reagent CPADB (1.17 mg, 7.20×10$^{-3}$ mmol) and the water soluble initiator 4,4'-Azobis(4-cyanovaleric acid) (V-501) (0.48 mg, 2.88×10$^{-3}$ mmol) at a molar ratio of $[DMA]_0/[CPADB]_0/[V-501]_0=500/2/0.8$ and toluene (0.30 mL) in the polymerization system were added to a 2 mL clean ampoule, in which a clean stir bar was added. The ampoule was positioned in liquid nitrogen to freeze the solution, after evacuating for 20-30 seconds, the ampoule was filled with argon, and then thawed at room temperature. This process was repeated three times. Then, the ampoule was sealed. The sealed ampoule was placed in the inner water bath of the glass jacketed reaction flask, and then the glass jacketed reaction flask was positioned at the center of a near-infrared ring light source ($\lambda_{max}$=810 nm, 100 mW/cm$^2$), where the glass jacketed reaction flask was placed on a magnetic stirrer, and the temperature for photothermal conversion is 60.0° C. After reaction for a certain time, the ampoule was cooled down and opened. 20 μL of a polymer (PDMA) solution was pipetted and dissolved in CDCl$_3$ for test by $^1$H NMR, and the conversion rate was calculated. The structural formula of the product PDMA prepared by the above method is shown below:

TABLE 2

Test results of polymerization at various polymerization times

| Entry | R | Time (h) | Conv. (%) | $M_{n,th}$ (g/mol) | $M_{n,GPC}$ (g/mol) | $M_w/M_n$ |
|---|---|---|---|---|---|---|
| 1 | 500/2/0.8 | 1.5 | 10.0 | 4000 | 5300 | 1.10 |
| 2 | 500/2/0.8 | 3 | 78.8 | 30000 | 39000 | 1.34 |

Table 2 shows the test results of polymerization at various polymerization times, in which R represents $[DMA]_0/[CPADB]_0/[V-501]_0$, the conversion rate of the monomer (Conv. %) is measured by $^1$H NMR, $M_{n,th}$ represents the molecular weight calculated according to the formula $M_{n,th}=M_{CPADB}$ [Monomer]$_0$/[CPADB]$_0$×$M_{monomer}$×Conv. (%), $M_{n,GPC}$ represents the molecular weight obtained by GPC, and $M_w/M_n$ represents the molecular weight distribution.

From the above polymerization results, it can be seen that the polymerization method of the present invention can also achieve the "living" radical polymerization of N,N-dimethylacrylamide monomer with good controllability and polymerization speed.

Example 4. Preparation of Polyglycidyl Methacrylate (PGMA) by RAFT Polymerization 35.0 mg of a near-infrared responsive croconaine dye represented by Formula (1) was dissolved in 7 mL of toluene, and transferred to an outer jacket layer, that is, a first chamber, of a glass jacketed reaction flask and used as a heat source for photothermal conversion. A water bath environment was provided in the inner layer of the glass jacketed reaction flask, where an ampoule (i.e., second chamber) containing a reaction solution was positioned. The reaction solution was prepared as follows. The monomer glycidyl methacrylate (GMA) (0.20 mL, 1.50 mmol), the RAFT reagent 2-cyanoprop-2-yl 1-dithionaphthalate (CPDN) (2.70 mg, 0.01 mmol) and the initiator AIBN (0.80 mg, 5.00×10$^{-3}$ mmol) at a molar ratio of $[GMA]_0/[CPDN]_0/[AIBN]_0=300/2/1$ and toluene (0.30 mL) were added to a 2 mL clean ampoule, in which a clean stir bar was added. The ampoule was positioned in liquid nitrogen to freeze the solution, after evacuating for 20-30 seconds, the ampoule was filled with argon, and then thawed at room temperature. This process was repeated three times. Then, the ampoule was sealed. The sealed ampoule was placed in the inner water bath of the glass jacketed reaction flask, and then the glass jacketed reaction flask was positioned at the center of a near-infrared ring light source ($\lambda_{max}$=810 nm, 100 mW/cm$^2$), where the glass jacketed reaction flask was placed on a magnetic stirrer, and the temperature for photothermal conversion is 58.8° C. After reaction for a certain time, the ampoule was cooled down and opened. 20 µL of a polymer (PGMA) solution was pipetted and dissolved in CDCl₃ for test by ¹H NMR, and the conversion rate was calculated. The structural formula of the product PGMA prepared by the above method is shown below:

TABLE 3

Test results of polymerization with the monomer GMA

| Entry | R | Time (h) | Conv. (%) | $M_{n,th}$ (g/mol) | $M_{n,GPC}$ (g/mol) | $M_w/M_n$ |
|---|---|---|---|---|---|---|
| 1 | 300/2/1 | 4 | 76.2 | 16400 | 17500 | 1.24 |

Table 3 shows the test results of polymerization with the monomer GMA under the above conditions, in which R represents [GMA]₀/[CPDN]₀/[AIBN]₀, the conversion rate of the monomer (Conv. %) is measured by NMR, $M_{n,th}$ represents the molecular weight calculated according to the formula $M_{n,th}=M_{CPDN}+[Monomer]_0/[CPDN]_0 \times M_{monomer} \times$ Conv. (%), $M_{n,GPC}$ represents the molecular weight obtained by GPC, and $M_w/M_n$ represents the molecular weight distribution.

From the above polymerization results, it can be seen that the polymerization method of the present invention can also achieve the "living" radical polymerization of glycidyl methacrylate monomer with good controllability and polymerization speed.

Example 5. Preparation of Polymethyl Acrylate (PMA) by RAFT 35.0 mg of a near-infrared responsive croconaine dye represented by Formula (1) was dissolved in 7 mL of toluene, and added to an outer jacket layer of a glass jacketed reaction flask (a first chamber) and used as a heat source for photothermal conversion. A water bath environment was provided in the inner layer of the glass jacketed reaction flask, where an ampoule (a second chamber) containing a reaction solution was positioned. The reaction solution was prepared as follows. The monomer methyl acrylate (MA) (0.30 mL, 3.31 mmol), the RAFT reagent CPDN (5.97 mg, 0.02 mmol) and the initiator AIBN (1.81 mg, 0.01 mmol) at a molar ratio of [MA]₀/[CPDN]₀/[AIBN]₀=300/2/1 and toluene (0.20 mL) were added to a 2 mL clean ampoule, in which a clean stir bar was added. The ampoule was positioned in liquid nitrogen to freeze the solution, after evacuating for 20-30 seconds, the ampoule was filled with argon and then thawed at room temperature. This process was repeated three times. Then, the ampoule was sealed. The sealed ampoule was placed in the inner water bath of the glass jacketed reaction flask, and then the glass jacketed reaction flask was positioned at the center of a near-infrared ring light source ($\lambda_{max}$=810 nm, 100 mW/cm²), where the glass jacketed reaction flask was placed on a magnetic stirrer, and the temperature for photothermal conversion is 60.0° C. After reaction for a certain time, the ampoule was cooled down and opened. 20 µL of a polymer (PGMA) solution was pipetted and dissolved in CDCl₃ for test by ¹H NMR, and the conversion rate was calculated. The structural formula of the product PMA prepared by the above method is shown below:

TABLE 4

Test results of polymerization with the monomer MA

| Entry | R | Time (h) | Conv. (%) | $M_{n,th}$ (g/mol) | $M_{n,GPC}$ (g/mol) | $M_w/M_n$ |
|---|---|---|---|---|---|---|
| 1 | 300/2/1 | 4 | 46.2 | 6100 | 4800 | 1.22 |

Table 4 shows the test results of polymerization with the monomer MA under the above polymerization conditions, in which R represents [MA]₀/[CPDN]₀/[AIBN]₀, the conversion rate of the monomer (Conv. %) is measured by NMR spectroscopy, $M_{n,th}$ represents the molecular weight calculated according to the formula $M_{n,th}=M_{CPDN}+[Monomer]_0/[CPDN]_0 \times M_{monomer} \times$ Conv. (%), $M_{n,GPC}$ represents the molecular weight obtained by GPC, and $M_w/M_n$ represents the molecular weight distribution.

From the above polymerization results, it can be seen that polymerization method of the present invention can also achieve the "living" radical polymerization of methyl acrylate monomer with good controllability.

Example 6. Preparation of Polystyrene (PS) by RAFT Polymerization 35.0 mg of a near-infrared responsive croconaine dye represented by Formula (1) was dissolved in 7 mL of toluene, and added to an outer jacket layer (a first chamber) of a glass jacketed reaction flask and used as a heat source for photothermal conversion. A water bath environment was provided in the inner layer of the glass jacketed reaction flask, where an ampoule (a second chamber) containing a reaction solution was positioned. The reaction solution was prepared as follows. The monomer styrene (St) (0.20 mL, 1.71 mmol), the RAFT reagent CPDN (2.40 mg, 8.60×10⁻³ mmol) and the initiator AIBN (0.70 mg, 4.26×10⁻³ mmol) at a molar ratio of [St]₀[CPDN]₀/[AIBN]₀=400/2/1 and toluene (0.30 mL) were added to a 2 mL clean ampoule, in which a clean stir bar was added. The ampoule was positioned in liquid nitrogen to freeze the solution, after evacuating for 20-30 seconds, the ampoule was filled with argon, and then thawed at room temperature. This process was repeated three times. Then, the ampoule was sealed. The sealed ampoule was placed in the inner water bath of the glass jacketed reaction flask, and then the glass jacketed reaction flask was positioned at the center of a near-infrared ring light source ($\lambda_{max}$=810 nm, 300 mW/cm²), where the glass jacketed reaction flask was placed on a magnetic stirrer, and the temperature for photothermal conversion is 90.2° C. After reaction for a certain time, the ampoule was cooled down and opened; and the conversion rate was measured by the gravimetric method. The structural formula of the product PS prepared by the above method is shown below:

TABLE 5

Test results of polymerization with the monomer St

| Entry | R | Time (h) | Conv. (%) | $M_{n,th}$ (g/mol) | $M_{n,GPC}$ (g/mol) | $M_w/M_n$ |
|---|---|---|---|---|---|---|
| 1 | 400/2/1 | 4 | 45.8 | 9800 | 9200 | 1.16 |

Table 5 shows the test results of polymerization with the St monomer under above conditions, in which R represents $[St]_0/[CPDN]_0/[AIBN]_0$, the conversion rate of the monomer (Conv. %) is calculated by the gravimetric method, $M_{n,th}$ represents the molecular weight calculated according to the formula $M_{n,th}=M_{CPDN}+[Monomer]_0/[CPDN]_0 \times M_{monomer} \times$ Conv. (%), $M_{n,GPC}$ represents the molecular weight obtained by GPC, and $M_w/M_n$ represents the molecular weight distribution.

From the above polymerization results, it can be seen that polymerization method of the present invention can also achieve the "living" radical polymerization of polystyrene monomer with good controllability.

Example 7. Preparation of Polymer PMMA by Atom Transfer Radical Polymerization (ATRP)

Figure 10:
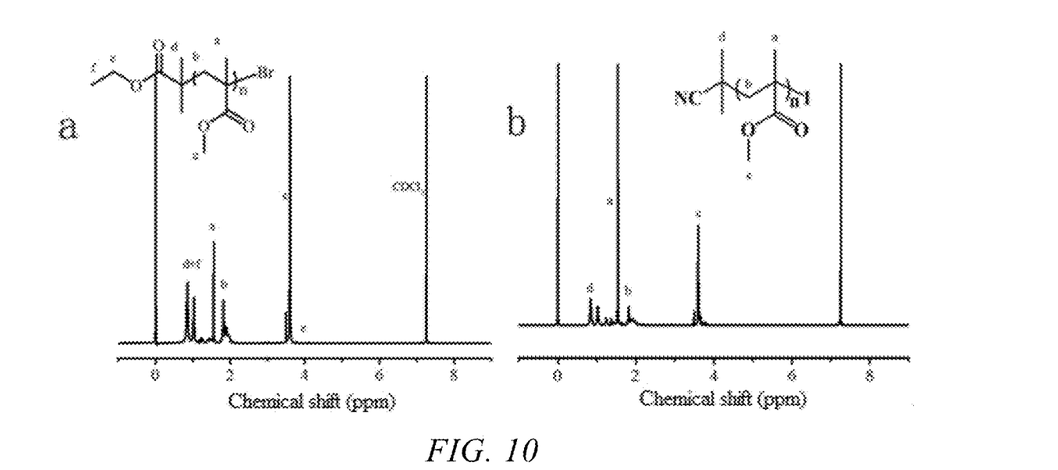
FIG. 10 shows a $^1$H NMR spectrum of the polymer PMMA in Example 7.
Figure 11:
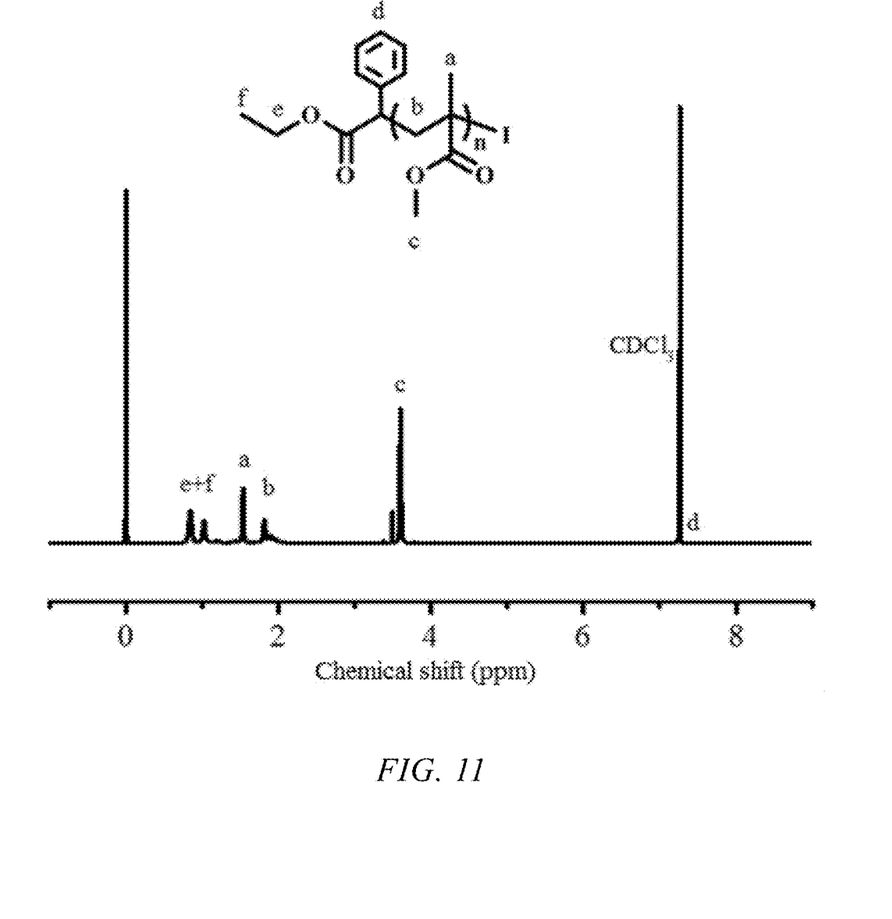
FIG. 11 shows a $^1$H NMR spectrum of the polymer PMMA in Example 8.

35.0 mg of a near-infrared responsive croconaine dye represented by Formula (1) was dissolved in 7 mL of toluene, and added to an outer jacket layer of a glass jacketed reaction flask (a first chamber) and used as a heat source for photothermal conversion. A water bath environment was provided in the inner layer of the glass jacketed reaction flask, where an ampoule (a second chamber) containing a reaction solution was positioned. The reaction solution was prepared as follows. Ethyl 2-bromoisobutyrate (EBiB) was used as an ATRP initiator to initiate the polymerization of the monomer MMA. The monomer MMA (0.25 mL, 2.35 mmol), the initiator EBiB (3.40 μL, 5.87×10⁻³ mmol), the catalyst CuBr (3.40 mg, 5.87×10⁻³ mmol), and the ligand bipyridine (bpy, 7.3 mg, 1.17×10⁻² mmol) at a molar ratio of $[MMA]_0/[EBiB]_0/[CuBr]_0/[bpy]_0=400/1/1/2$ and toluene (0.25 mL) were added to a 2 mL clean ampoule, in which a clean stir bar was added. In addition, several parallel experiments were done. The same monomer, catalyst and ligand were used, and the ATRP initiator was replaced by 2-iodo-2-methylpropionitrile (CP-I). MMA (0.25 mL, 2.35 mmol), CP-I (2.70 μL, 1.17×10⁻² mmol), CuBr (3.40 mg, 1.17×10⁻² mmol), and bpy (7.3 mg, 2.35×10⁻² mmol) at a molar ratio of $[MMA]_0/[CP-I]_0/[CuBr]_0/[bpy]_0=200/1/1/2$ and toluene (0.25 mL) were added to a 2 mL clean ampoule, in which a clean stir bar was added. The ampoule was positioned in liquid nitrogen to freeze the solution, after evacuating for 20-30 seconds, the ampoule was filled with argon, and then thawed at room temperature. This process was repeated three times, to completely remove oxygen in the ampoule. After removal of oxygen, the ampoule was quickly moved to the muzzle of a spray gun, to seal the ampoule by the outer flame. The sealed ampoule was placed in the inner water bath of the glass jacketed reaction flask, and then the glass jacketed reaction flask was positioned at the center of a near-infrared ring light source ($\lambda_{max}$=810 nm, 100 mW/cm²), where the glass jacketed reaction flask was placed on a magnetic stirrer, and the temperature for photothermal conversion is 60.0° C. After reaction for a certain time, the ampoule was cooled down and opened; and the conversion rate of monomer was calculated by the gravimetric method. The structural formula of the product PMMA prepared by the above method is shown below, and the test results by ¹H NMR are shown in FIGS. 10a and b respectively:

TABLE 6

Test results of polymerization with different initiators at various polymerization times

| Entry | R | I | Time (h) | Conv. (%) | $M_{n,th}$ (g/mol) | $M_{n,GPC}$ (g/mol) | $M_w/M_n$ |
|---|---|---|---|---|---|---|---|
| 1 | 400/1/1/2 | EBiB | 4 | 73.2 | 29500 | 28600 | 1.21 |
| 2 | 200/1/1/2 | CP-I | 2.5 | 16.2 | 3400 | 2200 | 1.22 |
| 3 | 200/1/1/2 | CP-I | 6 | 33.9 | 7000 | 5300 | 1.48 |

Table 6 shows the test results of polymerization under different polymerization conditions, in which R represents $[MMA]_0/[I]_0/[CuBr]_0/[bpy]_0$, the conversion rate of the monomer (Conv. %) is calculated by the gravimetric method, $M_{n,th}$ represents the molecular weight calculated according to the formula $M_{n,th}=M_I+[Monomer]_0[I]_0 \times M_{monomer} \times$Conv. (%), $M_{n,GPC}$ represents the molecular weight obtained by GPC, and $M_w/M_n$ represents the molecular weight distribution.

The results show that the polymer obtained by the ATRP method also has a controlled molecular weight and a narrow molecular weight distribution.

Example 8. Preparation of Polymer PMMA by In-Situ Bromine-Iodine Transformation "Living" Radical Polymerization 35.0 mg of a near-infrared responsive croconaine dye represented by Formula (1) was dissolved in 7 mL of toluene, and added to an outer jacket layer of a glass jacketed reaction flask (a first chamber) and used as a heat source for photothermal conversion. A water bath environment was provided in the inner layer of the glass jacketed reaction flask, where an ampoule (a second chamber) containing a reaction solution was positioned. The reaction solution was prepared as follows. The monomer MMA (1 mL, 9.4 mmol), the ATRP initiator ethyl 2-bromophenylacetate (EBPA) (17 μL, 9.4×10$^{-2}$ mmol), NaI (15 mg, 0.106 mmol), and the catalyst tetrabutylammonium iodide (BNI) (37 mg, 0.106 mmol) at a molar ratio of [MMA]$_0$/[EBPA]$_0$/[NaI]$_0$/[BNI]$_0$=800/8/9/9 were added to a 2 mL clean ampoule, in which a clean stir bar was added. The ampoule was positioned in liquid nitrogen to freeze the solution, after evacuating for 20~30 seconds, the ampoule was filled with argon, and then thawed at room temperature. This process was repeated three times, to completely remove oxygen in the ampoule. After removing oxygen, the ampoule was quickly moved to the mouth of a spray gun, to seal the ampoule by the outer flame. The sealed ampoule was placed in the inner water bath of the glass jacketed reaction flask, and then the glass jacketed reaction flask was positioned at the center of a near-infrared ring light source ($\lambda_{max}$=810 nm, 100 mW/cm$^2$), where the glass jacketed reaction flask was placed on a magnetic stirrer, and the temperature for photothermal conversion is 60.0° C. After reaction for a certain time, the ampoule was cooled down and opened; and the conversion rate was calculated by the gravimetric method. The structural formula of the product PMMA prepared by the above method is shown below:

TABLE 7

Test results of bromine-iodine transformation "living" radical polymerization

| Entry | R | Time (h) | $^b$Conv. (%) | $^c$M$_{n,\,th}$ (g/mol) | $^d$M$_{n,\,GPC}$ (g/mol) | $^d$M$_w$/M$_n$ |
|---|---|---|---|---|---|---|
| 1 | 800/8/9/9 | 5 | 51.8 | 5400 | 5100 | 1.20 |

Table 7 shows the test results of polymerization under above conditions, in which R represents [MMA]$_0$/[EBPA]$_0$/[NaI]$_0$/[BNI]$_0$, the conversion rate of the monomer (Conv. %) is calculated by the gravimetric method, M$_{n,th}$ represents the molecular weight calculated according to the formula M$_{n,th}$=M$_{EBP-I}$+[Monomer]$_0$/[EBPA]$_0$×M$_{monomer}$×Conv. (%), M$_{n,GPC}$ represents the molecular weight obtained by GPC, and M$_w$/M$_n$ represents the molecular weight distribution.

The results show that the polymer obtained by in-situ bromine-iodine transformation "living" radical polymerization method also has a controlled molecular weight and a narrow molecular weight distribution.

Example 9. Preparation of Polymer PMMA by Photothermal Conversion with Different Croconaine Dyes In this example, the photothermal conversion with croconaine dyes of Formulas (2) and (3) in the specification in place of the croconaine dye of Formula (1) was investigated. These dyes also have high-efficiency photothermal conversion abilities to achieve the "living" radical polymerization of vinyl monomer. 35.0 mg of each of two croconaine dyes of Formulas (2) and (3) was dissolved in 7 mL of toluene, and added to the designed jacket, (the first chamber). A water bath environment was provided in the inner layer of glass jacketed reaction flask, where an ampoule (the second chamber) containing a reaction solution was positioned. The glass jacketed reaction flask was positioned at the center of a near-infrared ring light source ($\lambda_{max}$=810 nm, 100 mW/cm$^2$), where the glass jacketed reaction flask was placed on a magnetic stirrer.

The reaction solution was prepared as follows. The monomer methyl methacrylate (MMA) (0.20 mL, 1.88 mmol), the RAFT reagent 4-cyano-4-(thiobenzoyl)pentanoic acid (CPADB) (2.10 mg, 7.53×10$^{-3}$ mmol) and the thermal initiator azodiisobutyronitrile (AIBN) (0.62 mg, 3.76×10$^{-3}$ mmol) at a molar ratio of [MMA]$_0$/[CPADB]$_0$/[AIBN]$_0$=500/2/1 and toluene (0.30 mL) were added to a 2 mL clean ampoule, in which a clean stir bar was added. The mixed solution was a pink homogeneous solution. The ampoule was positioned in liquid nitrogen to freeze the solution, after evacuating for 20-30 seconds, the ampoule was filled with argon, and then thawed at room temperature. This process was repeated three times to remove oxygen in the ampoule completely. After removing oxygen, the ampoule was quickly moved to the mouth of a spray gun, to seal the ampoule by the outer flame. The sealed ampoule was placed in the inner water bath of the glass jacketed reaction flask, and then the glass jacketed reaction flask was positioned at the center of a near-infrared ring light source ($\lambda_{max}$=810 nm, 100 mW/cm$^2$), where the glass jacketed reaction flask was placed on a magnetic stirrer. The temperature for photothermal conversion is as shown in Table 8. After reaction for a certain time, the ampoule was cooled down and opened. 20 μL of a polymer solution was pipetted and dissolved in CDCl$_3$ for test by $^1$H NMR, and the conversion rate was calculated. The structural formula of the product PMMA prepared by the above method has the same structural formula as that in Example 1.

TABLE 8

Test results of polymerization by photothermal conversion with different dyes

| Entry | R | NIR dye | T (° C.) | Time (h) | Conv. (%) | M$_{n,\,th}$ (g/mol) | M$_{n,\,GPC}$ (g/mol) | M$_w$/M$_n$ |
|---|---|---|---|---|---|---|---|---|
| 1 | 500/2/1 | Formula (2) | 64 | 1.5 | 20.8 | 5500 | 6600 | 1.13 |
| 2 | 500/2/1 | Formula (3) | 62 | 2 | 28.6 | 7500 | 7300 | 1.11 |

Table 8 shows the test results of polymerization by RAFT polymerization through photothermal conversion with croconaine dyes of different structures, in which R represents [MMA]$_0$/[CPADB]$_0$/[AIBN]$_0$, the conversion rate of the monomer (Conv. %) was calculated by $^1$H NMR, and T represents the temperature of the reaction solution in the ampoule, $M_{n,th}$ represents the molecular weight calculated according to the formula $M_{n,th}$ $M_{CPADB}$+[Monomer]$_0$/[CPADB]$_0$×$M_{monomer}$×Conv. (%), $M_{n,GPC}$ represents the molecular weight obtained by GPC, and $M_w/M_n$ represents the molecular weight distribution.

It can be known from Table 8 that the croconaine dyes (2) and (3) still have high photothermal conversion efficiency, with which the "living" radical polymerization of vinyl monomers can be achieved by photothermal conversion in a device of the present invention.

In the present invention, besides methyl methacrylate (MMA), methyl acrylate (MA), N,N-dimethylacrylamide (DMA), glycidyl methacrylate (GMA) and styrene (St), the monomer used for polymerization can also be butyl (meth) acrylate, polyethylene glycol monomethyl ether (meth)acrylate, hydroxyethyl (meth)acrylate, hydroxypropyl (meth) acrylate, N,N-dimethylaminoethyl (meth)acrylate, N,N-diethylacrylamide, N-dihydroxyethylacrylamide, with which "living"/controlled polymers can also be obtained by the above-mentioned polymerization method.

In summary, by means of the photothermal conversion characteristics of near-infrared responsive croconaine dyes with different structures, the "living" radical polymerization of vinyl monomers is achieved in the present invention by photothermal conversion under the irradiation of a near-infrared ring light source ($\lambda_{max}$=810 nm), and excellent "living"/controlled polymerization characteristics are shown. For example, the conversion rate reaches 81.9% at 7 h, and the molecular weight distribution is also narrow ($M_w/M_n$<1.20). The molecular weight by GPC of the obtained polymer is close to the theoretical molecular weight, which indicates that the polymer has a high degree of terminal functionalization. The polymerization kinetics conform to the characteristics of first-order kinetics. By chain extension of low-molecular-weight polymers, high-molecular-weight polymers are obtained, which proves that the polymerization is "living"/controlled radical polymerization.

While preferred embodiments of the present invention have been described above, the present invention is not limited thereto. It should be appreciated that some improvements and variations can be made by those skilled in the art without departing from the technical principles of the present invention, which are also contemplated to be within the scope of the present invention.

What is claimed is:

1. A "living" radical polymerization method for a vinyl monomer by near-infrared photothermal conversion, comprising:
    irradiating a reactor with near-infrared light having a wavelength of 750-850 nm, wherein the reactor is provided with a first chamber and a second chamber which are isolated from each other, the first chamber contains an organic solution of a near-infrared light responsive dye, and the second chamber is provided with a closed reaction flask containing a reaction solution; and wherein the near-infrared light is irradiated into the first chamber, so that the near-infrared light responsive dye in the first chamber converts the near-infrared light into heat energy, by which the reaction solution in the second chamber is heated to 50-100° C. to allow "living" radical polymerization of the vinyl monomer in the reaction solution to obtain polymers selected from the group consisting of Formula (4), Formula (5) and Formula (6);
    wherein the near-infrared light responsive dye is selected from the group consisting of the croconaine compounds of Formula (1), Formula (2), Formula (3) and any combination thereof:

(1)

(2)

(3)

in which $n_1$ and $n_2$ are each independently selected from 1-10;

the reaction solution comprises a vinyl monomer, an organic solvent, an ATRP initiator, an ATRP ligand, and an ATRP catalyst; or the reaction solution comprises a vinyl monomer, an organic solvent, an RAFT reagent, and a thermal initiator; or the reaction solution comprises a vinyl monomer, an organic solvent, an ATRP initiator and an additive, where the additive is an organic amine and/or an iodine-containing compound; and wherein the polymers of Formula (4), Formula (5) and Formula (6) respectively has a structure below:

(4)

(5)

(6)

in which $m_1$, $m_2$ and $m_3$ are each independently selected from 10-300;

$R_1$, $R_1'$ and $R_1''$ are each independently selected from the group consisting of isobutylcyano, 4-cyanovaleric acid-yl, ethyl 2-phenylacetate substituent group, and ethyl 2-isobutyrate substituent group $R_2$, $R_2'$ and $R_2''$ are each independently selected from the group consisting of hydrogen and methyl;

$R_3$, $R_3'$ and $R_3$ are each independently selected from the group consisting of phenyl, 2-naphthyl, bromo, chloro, and iodo;

$R_4$ is selected from the group consisting of methyl, butyl, polyethylene glycol monomethyl ether, hydroxyethyl, hydroxypropyl, and N, N-dimethylaminoethyl;

$R_5$ is selected from the group consisting of hydrogen, methyl, ethyl or hydroxymethyl; and $R_6$ is selected from the group consisting of hydrogen, methyl, ethyl, and hydroxymethyl.

2. The "living" radical polymerization method according to claim 1, wherein in the organic solution of the near-infrared light responsive dye, the concentration of the near-infrared light responsive dye is 1.0-10.0 mg/mL; and the power of the near-infrared light is 0.05-1.0 W/cm².

3. The "living" radical polymerization method according to claim 1, wherein the vinyl monomer is methyl acrylate, methyl methacrylate, butyl acrylate, butyl methacrylate, polyethylene glycol monomethyl ether acrylate, polyethylene glycol monomethyl ether methacrylate, hydroxyethyl acrylate, hydroxyethyl methacrylate, hydroxypropyl acrylate, hydroxypropyl methacrylate, N,N-dimethylaminoethyl methacrylate, glycidyl methacrylate, styrene, N,N-dimethylacrylamide, N, N-diethylacrylamide, or N-dihydroxyethylacrylamide.

4. The "living" radical polymerization method according to claim 1, wherein the ATRP initiator is selected from the group consisting of ethyl 2-bromophenylacetate, ethyl 2-bromoisobutyrate and 2-iodo-2-methylpropionitrile and any combination thereof; the ATRP ligand is selected from the group consisting of bipyridine, pentamethyldivinyltriamine, hexamethyltrivinyltetraamine and triphenylphosphine and any combination thereof; and the ATRP catalyst is selected from the group consisting of CuBr, CuCl, $FeBr_2FeCl_2$ and any combination thereof.

5. The "living" radical polymerization method according to claim 1, wherein the RAFT reagent is 2-cyanoprop-2-yl 1-dithionaphthalate or 4-cyanopentanoicacid dithiobenzoate; and the thermal initiator is azodiisobutyronitrile and/or benzoyl peroxide.

6. The "living" radical polymerization method according to claim 1, wherein the additive is selected from the group consisting of NaI, KI, triethylamine, triethanolamine, tetrabutylammonium iodide and any combination thereof; and the organic solvent is selected from the group consisting of toluene, acetone, ethanol, methanol, N,N-dimethylformamide, dimethyl sulfoxide and any combination thereof.

7. The "living" radical polymerization method according to claim 1, wherein the molar ratio of the vinyl monomer, the RAFT reagent and the thermal initiator is 50-1000:2:1-0.5; the molar ratio of the vinyl monomer, the ATRP initiator, the ATRP catalyst and the ATRP ligand is 50-1000:1:0.01-1.5:0.3-4.5; and the molar ratio of the vinyl monomer, the ATRP initiator and the additive is 50-1000:1:1-10.

8. The "living" radical polymerization method according to claim 1, wherein in the reaction solution, the concentration of the vinyl monomer is 1.0-8.0 mol/L.

9. The "living" radical polymerization method according to claim 1, wherein the second chamber is surrounded by the first chamber, and the first chamber is surrounded by a near-infrared light generator.

* * * * *